(12) United States Patent
Nitsche et al.

(10) Patent No.: US 11,573,554 B2
(45) Date of Patent: Feb. 7, 2023

(54) DRIVE SYSTEM, TRAJECTORY PLANNING UNIT AND METHOD

(71) Applicant: Festo SE & Co. KG, Esslingen (DE)

(72) Inventors: Rainer Nitsche, Kirchheim (DE); Matthias Joachimsthaler, Karlsruhe (DE); Fabian Wiek, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 366 days.

(21) Appl. No.: 16/786,223

(22) Filed: Feb. 10, 2020

(65) Prior Publication Data
US 2020/0257262 A1 Aug. 13, 2020

(30) Foreign Application Priority Data

Feb. 12, 2019 (DE) ..................... 10 2019 201 798.3

(51) Int. Cl.
| | | |
|---|---|---|
| G05B 19/402 | (2006.01) | |
| G05B 19/416 | (2006.01) | |
| G05B 11/40 | (2006.01) | |
| G05B 11/38 | (2006.01) | |
| G05B 11/42 | (2006.01) | |

(52) U.S. Cl.
CPC ............ G05B 19/402 (2013.01); G05B 11/38 (2013.01); G05B 11/40 (2013.01); G05B 11/42 (2013.01); G05B 19/416 (2013.01)

(58) Field of Classification Search
CPC ...... G05B 19/402; G05B 11/38; G05B 11/40; G05B 11/42; G05B 19/41
See application file for complete search history.

(56) References Cited

U.S. PATENT DOCUMENTS

| | | | | |
|---|---|---|---|---|
| 6,140,787 A | * | 10/2000 | Lokhorst ................... | E02F 9/26 701/50 |
| 9,871,418 B2 | * | 1/2018 | Huh ....................... | H02K 29/12 |
| 2006/0138990 A1 | * | 6/2006 | Ide ......................... | G05B 19/19 318/609 |
| 2006/0181240 A1 | * | 8/2006 | Nguyen Phuoc ......... | H02P 3/18 318/807 |
| 2010/0085003 A1 | * | 4/2010 | Spring ..................... | H02P 8/24 318/561 |
| 2019/0145668 A1 | * | 5/2019 | Takahashi .............. | G05B 11/38 62/115 |

FOREIGN PATENT DOCUMENTS

| | | |
|---|---|---|
| DE | 19744218 C1 | 4/1999 |
| DE | 102005059530 A1 | 10/2006 |
| DE | 102012013739 A1 | 5/2014 |
| WO | 2016198109 A1 | 12/2016 |

* cited by examiner

Primary Examiner — Zoheb S Imtiaz
(74) Attorney, Agent, or Firm — Hoffmann & Baron, LLP

(57) ABSTRACT

A drive system (10), in particular for process automation, includes: a trajectory planning unit (3), which is adapted to provide a trajectory signal (xd) on the basis of a setpoint signal (xs), and an actuator unit (2) having an actuator member (1), in particular a valve member, which actuator unit (2) is adapted to control and/or regulate a position of the actuator member (1) on the basis of the trajectory signal (xd). The trajectory planning unit (3) is adapted to provide the trajectory signal (xd) with a first signal section (s1) and a second signal section (s2), the first signal section (s1) having a straight signal form and the second signal section (s2) having a signal form asymptotic to the setpoint signal (xs).

15 Claims, 2 Drawing Sheets

DRIVE SYSTEM, TRAJECTORY PLANNING UNIT AND METHOD

BACKGROUND OF THE INVENTION

The invention pertains to a drive system, in particular for process automation. The drive system comprises a trajectory planning unit which is adapted to provide a trajectory signal based on a setpoint signal. The drive system further comprises an actuator unit which includes an actuator member, in particular a valve member. The actuator unit is adapted to control (e.g. open-loop control) and/or regulate (e.g. closed-loop control) a position of the actuator member on the basis of the trajectory signal.

The drive system is preferably a fluidic drive system. The actuator unit is preferably a fluidic actuator unit. Alternatively or additionally, the drive system may be an electric drive system and/or the actuator unit may be an electric actuator unit.

The actuator unit comprises in particular a control (e.g. open-loop control) and/or a regulator (e.g. closed-loop control) unit which is adapted to perform a control (e.g. open-loop control) and/or a regulation (e.g. closed-loop control) of the position of the actuator member on the basis of a setpoint setting. Expediently, the trajectory signal serves as the setpoint setting for the control and/or regulator unit. The trajectory planning unit is in particular connected upstream of the control and/or regulator unit. Expediently, the trajectory planning unit is connected between a control device providing the setpoint signal and the actuator unit, in particular the control and/or regulator unit.

WO2016/198109A1 describes a fluidic drive system with a path planning unit that provides at least one movement value for a control means and a regulating means on the basis of a setpoint value.

SUMMARY OF THE INVENTION

It is an object to improve the drive system mentioned at the beginning in such a way that an easily parameterizable trajectory signal is provided, by means of which a fast and safe regulation and/or control of the position of the actuator member is made possible.

The object is solved by a drive system having a trajectory planning unit which is adapted to provide the trajectory signal with a first signal section and a second signal section, the first signal section having a straight signal form and the second signal section having a signal form asymptotic to the setpoint signal.

Such a trajectory signal can be parameterized very easily. As will be explained in detail below, only two or only one parameter is needed for the parameterization of such a trajectory signal, in order to adapt the trajectory signal for a specific application and/or a specific actuator unit, for example. As parameters, for example, only a maximum velocity value of the actuator member and/or a signal parameter to set at which signal value of the trajectory signal and/or at which time the first signal section ends and/or the second signal section begins, are required. From these two parameters, both the first signal section and the second signal section result (on the basis of the setpoint signal). The trajectory signal can therefore be parameterized very easily and with very little effort. Expediently, the drive system is adapted to carry out the parameterization automatically, for example by automatically determining the maximum velocity value via a maximum velocity determination procedure.

Furthermore, by means of such a trajectory signal a fast and, at the same time, safe control and/or regulation of the actuator member may be achieved. By means of the first signal section having the straight form, it can be achieved that the actuator member is moved at the highest possible velocity, in particular its maximum velocity, towards the desired setpoint. By means of the second signal section having the asymptotic form, it can be achieved that no overshooting of the actuator member beyond the specified setpoint occurs, thus ensuring safe control (e.g. open-loop control) and/or regulation (e.g. closed-loop control).

The invention further pertains to a trajectory planning unit for providing a trajectory signal for controlling (e.g. open-loop controlling) and/or regulating (e.g. closed-loop controlling) a position of an actuator member, the trajectory planning unit comprising: a planning unit input for inputting a setpoint signal, a planning unit output for outputting the trajectory signal, and a retardation unit connected between the planning unit input and the planning unit output, the retardation unit having an integrating element. The trajectory planning unit further includes a limiting unit connected before the integrating element. The retardation unit may also be referred to as lag unit or delay unit ("Verzögerungseinheit" in German).

Expediently, the trajectory planning unit is used in a drive system described here to provide the trajectory signal.

The invention further pertains to a method for controlling (e.g. open-loop controlling) and/or regulating (e.g. closed-loop controlling) the position of an actuator member of a drive system, comprising the steps: providing a setpoint signal for the position of the actuator member, providing a trajectory signal on the basis of the setpoint signal, the trajectory signal having a first signal section with a straight signal form and having a second signal section with a signal form asymptotic to the setpoint signal, and controlling (e.g. open-loop controlling) and/or regulating (e.g. closed-loop controlling) the position of the actuator member in accordance with the trajectory signal.

Expediently, the method is used to operate a drive system described here and/or is adapted according to a drive system embodiment described here.

BRIEF DESCRIPTION OF THE DRAWINGS

In the following, exemplary embodiments are explained in more detail with reference to the figures. Thereby shows FIG. 1 a schematic representation of a drive system, FIG. 2 a schematic representation of a trajectory planning unit, FIG. 3 a diagram of a time course of a control signal and a diagram of a time course of a position of an actuator member during a maximum velocity determination procedure, FIG. 4 a diagram of a time course of a trajectory signal.

DETAILED DESCRIPTION

Figure 1:
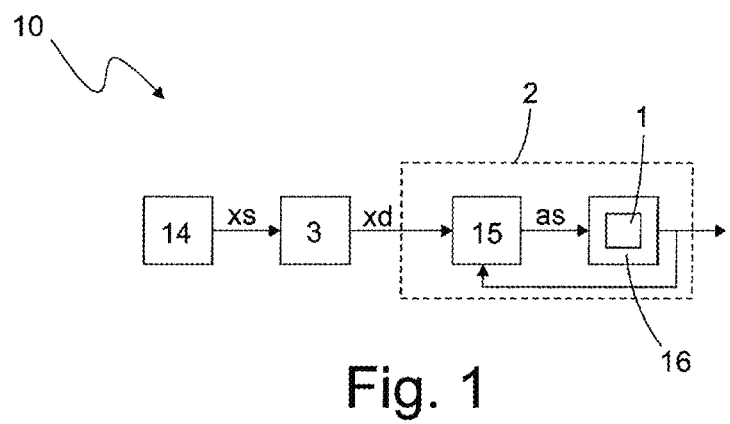

FIG. 1 shows a drive system 10, which is used in particular for process automation.

The drive system 10 comprises an actuator unit 2 with an actuator member 1, for example a valve member. The actuator unit 2 is adapted to control (e.g. open-loop control) and/or regulate (e.g. closed-loop control) a position of the actuator member 1 on the basis of a trajectory signal xd.

The drive system 10 is preferably a fluidic drive system. The actuator unit 2 is preferably a fluid actuator unit.

Alternatively or additionally, the drive system 10 may be an electric drive system and/or the actuator unit 2 may be an electric actuator unit.

Figure 4:
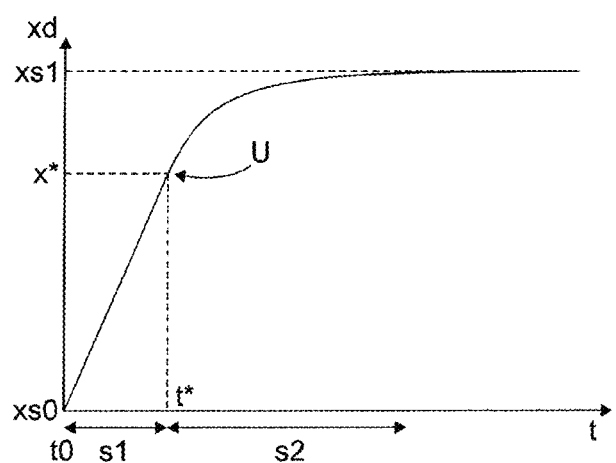

The drive system 10 further comprises a trajectory planning unit 3, which is adapted to provide the trajectory signal xd on the basis of a setpoint signal xs. The trajectory planning unit 3 is adapted to provide the trajectory signal xd with a first signal section s1 and a second signal section s2. As shown in FIG. 4, the first signal section s1 has a straight signal form and the second signal section s2 has a signal form which is asymptotic to the setpoint signal xs.

Further exemplary details are explained below.

First regarding the basic structure of the drive system 10:

The drive system 10 includes, as an example, a control device 14, which is preferably a higher-level controller, for example a programmable logic controller, PLC.

The control device 14 is adapted to provide a setpoint signal xs. The setpoint signal xs specifies a setpoint, in particular a setpoint position, for the actuator member 1. Expediently, the setpoint signal comprises a time sequence of setpoints. The setpoint signal is in particular a step signal. Preferably, the setpoint signal comprises a signal step from a first setpoint which specifies a first position to a second setpoint which specifies a second position. In particular, the setpoint signal is an electrical signal; expediently an analog or a digital signal.

The setpoint signal xs is fed to the trajectory planning unit 3. The trajectory planning unit 3 provides the trajectory signal xd based on the setpoint signal xs.

The trajectory signal xd is fed to the actuator unit 2. The actuator unit 2 carries out a regulation (e.g. a closed-loop control) and/or a control (e.g. an open-loop control) of the position of the actuator member 1 on the basis of the trajectory signal xd. The trajectory signal xd serves in particular as a setpoint setting, for example as a reference variable or command variable, for the regulation and/or control performed by the actuator unit 2. The trajectory signal xd is in particular an electrical signal; expediently an analog signal or a digital signal.

As an example, the actuator unit 2 comprises a control and/or regulator unit 15 (e.g. an open-loop and/or closed-loop control unit) and an actuator 16, which comprises the actuator member 1. The actuator 16 is in particular a fluidic actuator. The actuator unit 2 is in particular a process valve unit.

The control and/or regulator unit 15 is expediently designed as a control head, a position regulator head and/or a positioner. The control and/or regulator unit 15 is expediently attached to the actuator 16, in particular mounted on top of the actuator, and has, for example, a mechanical interface with which the control and/or regulator unit 15 is attached to the actuator 16.

The control and/or regulator unit 15 is expediently adapted to provide a preferably fluidic, in particular a pneumatic or hydraulic, control signal "as" on the basis of the trajectory signal xd and/or the setpoint signal xs. The control signal "as" is fed to the actuator 16 in order to cause an actuation, in particular a change of position, of the actuator member 1. The control and/or regulator unit 15 comprises an electro-fluidic, in particular electro-pneumatic, converter for generating the control signal "as".

The control and/or regulator unit 15 is adapted to control the actuator 16 with the control signal "as" in such a way that the actuator member 1 assumes a position specified by the trajectory signal xd.

Expediently, the actuator 16 includes a valve, in particular a process valve. The actuator member 1 is the valve member of the valve, for example. The actuator 16 further includes a fluidic valve drive. The fluidic valve drive comprises at least one pressure chamber which can be actuated by the control signal "as" in order to set the actuator member 1, in particular the valve member, in motion.

As an example, the actuator member 1, in particular the valve member, can be moved by the control signal "as" into a first position corresponding to a first setpoint, for example a closed position, and/or into a second position corresponding to a second setpoint, for example an open position. Expediently, the actuator member 1 can further be moved into one or more further positions.

The actuator unit 2 expediently comprises a sensor unit, for example a position sensor, which can be used to determine the position of the actuator member 1. Expediently, the control and/or regulator unit 15 is adapted to regulate (e.g. closed-loop control) the position of the actuator member 1 taking into account the sensor signal from the sensor unit. For example, the control and/or regulator unit 15 takes into account the sensor signal, in particular the detected position of actuator member 1, as a feedback variable in the position regulation (e.g. closed-loop position control) of the actuator member 1. The control and/or regulator unit 15 uses the trajectory signal xd in particular as a reference variable and, within the control to be performed, expediently forms the difference between the trajectory signal xd and the feedback variable in order to determine a control deviation and, on the basis of the determined control deviation, provides the control signal "as", in particular in such a way that the control deviation is minimized.

Alternatively, the control and/or regulator unit 15 can also be adapted to carry out no regulation (e.g. no closed-loop control) on the basis of the trajectory signal xd, but instead only a "pure" control, i.e. an open-loop control without feedback.

The trajectory planning unit 3 can be provided as a separate unit as an example. Alternatively, the trajectory planning unit 3 can be integrated together with the control and/or regulator unit 15 in one unit, e.g. in a control head, position regulator head and/or positioner. Furthermore, the trajectory planning unit 3 can be integrated in the control device 14.

In the following, the trajectory planning unit 3 and especially the trajectory signal xd generated by the trajectory planning unit 3 will be discussed in more detail.

FIG. 4 shows an exemplary time course of the trajectory signal xd. The time t is plotted on the horizontal axis. The signal value of the trajectory signal xd is plotted on the vertical axis. Exemplarily, the trajectory signal xd has an overall monotonous, in particular strictly monotonous signal shape. As an example, the trajectory signal xd is monotonous, in particular strictly monotonous, rising from an starting value xs0 to a setpoint xs1 specified by the setpoint signal xs. Further, the trajectory signal can also be monotonous, in particular strictly monotonous, falling, especially if a step downwards and/or smaller xs0 is specified by the setpoint signal xs. The trajectory signal xd and/or its first derivative is expediently continuous, in particular over the entire first signal section s1, the entire second signal section s2 and/or the junction between the first signal section s1 and the second signal section s2. The trajectory signal xd preferably has no overshoot over the setpoint xs1.

The trajectory signal xd is expediently a step response to a step of the setpoint signal xs. As an example, the setpoint signal xs jumps to the signal value xs1 at time to, expediently starting from the signal value xs0, for example from the signal value xs=0.

The trajectory signal xd comprises the two signal sections s1 and s2. The two signal sections s1, s2 are successive signal sections in time that do not overlap in time. Expediently, the signal values of the signal sections S1 and S2 do not overlap.

The first signal section s1 has a straight signal form—i.e. in particular it has a constant slope. Expediently, the first signal section s1 consists exclusively of a straight signal form. The first signal section s1 preferably starts at the signal value xs0, from which the step or jump of the setpoint signal xs starts.

The second signal section s2 has a signal form asymptotic to the signal value xs1. As an example, the second signal section has the signal form of limited growth ("beschränktes Wachstum" in German) Expediently, the second signal section s2 consists exclusively of the asymptotic signal form.

The signal form may also be referred to as "signal waveform", "signal shape" or "signal course".

As an example, the second signal section s2 is directly connected to the first signal section s1. The junction U from the first signal section s1 to the second signal section s2 is expediently continuous. Preferably the junction U from the first signal section s1 to the second signal section s2 is also continuous in the first derivative. The trajectory signal xd therefore has no kink at the junction U from the first signal section s1 to the second signal section s2. The slope of the beginning of the second signal section s2 is expediently equal to the slope of the first signal section s1. As an example, the slope of the second signal section s2 decreases from its beginning. The junction U may also be referred to as transition U.

In the following the parameterization of the trajectory signal xd will be described in more detail.

The trajectory planning unit 3 is adapted to provide the straight signal form based on a maximum velocity value vmax of the actuator member 1. Expediently, the maximum velocity value vmax is a value determined in advance. The maximum velocity value vmax is in particular the value of a determined maximum movement velocity with which the actuator member 1 can be moved from a first position, for example a first end position and/or a position in which the valve unit is closed, to a second position, for example a second end position and/or a position in which the valve unit is open. The trajectory planning unit 3 is especially adapted to provide the straight signal form with a slope equal to the maximum velocity value vmax of the actuator member 1. The first signal section s1 begins exemplarily with the same value as the value of the setpoint signal xs, from which the step or jump in the setpoint signal xs occurs. For example, the first signal section s1 begins with the signal value xs0 and then rises with a constant slope until the junction U.

As explained in more detail below, the trajectory planning unit 3 has a first maximum velocity value vmax1 and a second maximum velocity value vmax2 and is adapted to selectively provide the first signal section s1 with a slope equal to the first maximum velocity value vmax1 or with a slope equal to the second maximum velocity value vmax2, depending on the direction in which the setpoint signal xs moves (i.e. rising or falling). Preferably, the first maximum velocity value vmax1 and the second maximum velocity value vmax2 differ in their sign and/or in their magnitude.

The trajectory planning unit 3 is adapted to provide the trajectory signal xd, in particular the first signal section s1 and/or the second signal section s2, on the basis of a time constant T. The time constant T is in particular the time constant that describes the time behavior of a retardation element, in particular a first-order retardation element ("Verzögerungsglied erster Ordnung" in German). The time constant T specifies the ratio of the difference between the setpoint signal xs and the trajectory signal xd to the slope of the trajectory signal xd. The drive system 10, in particular the trajectory planning unit 3, is expediently adapted to provide the time constant T on the basis of the maximum velocity value vmax. The drive system 10, in particular the trajectory planning unit 3, is further adapted to provide the time constant T on the basis of the setpoint signal xs. Expediently, the trajectory planning unit 3 is adapted to provide different time constants T for different setpoints or setpoint steps or jumps of the setpoint signal xs. If a step or jump to a first setpoint is specified by the setpoint signal xs, for example, a different time constant is calculated than if a step or jump to a second setpoint different from the first setpoint is specified by the setpoint signal xs.

As an example, the trajectory planning unit 3 is adapted to determine the time constant on the basis of the maximum velocity value vmax and on the basis of the setpoint signal xs, and expediently further on the basis of a signal parameter "a", as follows:

$$T=(1-a)xs/vmax$$

For "xs", in particular the value of the setpoint signal xs to which the setpoint signal xs jumps—e.g. xs1 in the example in FIG. 4—is to be used.

The signal parameter "a" can be used to define at which signal value of the trajectory signal xd the junction U from the first signal section s1 to the second signal section s2 occurs. As an example, the signal parameter "a" is between 0 and 1. The signal parameter "a" specifies, as an example, at what proportion of the signal value change (to be carried out) of the trajectory signal xd the junction U is located—i.e. how large on the signal value axis (i.e. the vertical axis) the first signal section s1 is relative to the sum of the first and second signal sections s1, s2. As an example, the trajectory signal undergoes a signal value change from 0 to xs1. The parameter "a" can be used to set at which proportion of the difference between 0 and xs1 the junction U from the first signal section s1 to the second signal section s2 should occur. The junction U occurs when the trajectory signal xd is xd=a xs1. Preferably, the parameter "a" is greater than 0.5, in particular greater than 0.7, preferably greater than 0.8 and/or expediently less than 0.9. Expediently, the parameter "a" is selectable, in particular adjustable by a user.

The signal value of the trajectory signal xd at which the junction U occurs shall also be referred to as x*. The corresponding point in time at which the junction U occurs shall also be referred to as t*.

Consequently, the signal parameter "a" can be used to set at which signal value x* and/or at which time t* the first signal section s1 ends and/or the second signal section s2 begins. Preferably the signal parameter "a", the signal value x* and/or the time t* can be entered into the trajectory planning unit 3 via a user interface. The trajectory planning unit 3 is adapted to provide the trajectory signal xd based on the signal parameter "a".

In the following, it will be discussed how the maximum velocity value vmax may be obtained.

Expediently, the drive system 10 is adapted to perform a maximum velocity detection determination in which the actuator member 1 is set in motion to determine the maximum velocity value vmax of the actuator member 1. Preferably, the drive system 10 is adapted to perform the maximum velocity determination procedure outside of a normal operation of the drive system 10, in particular before a normal operation, e.g. during an initialization phase.

Figure 3:
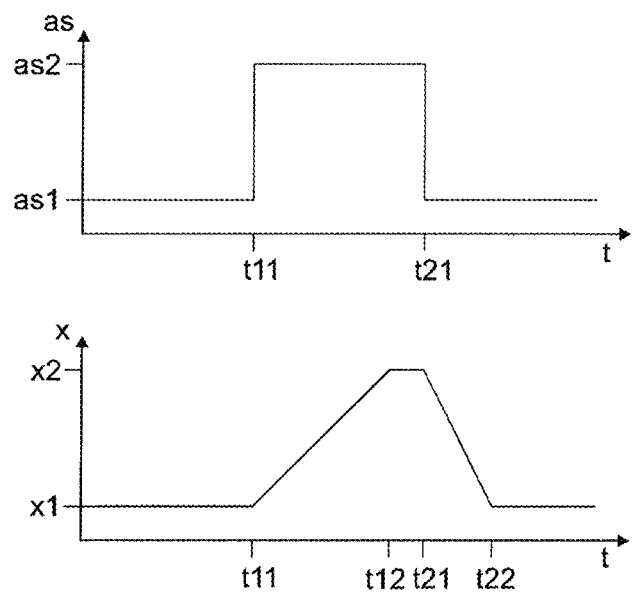

An exemplary maximum velocity determination procedure will be explained in more detail below with reference to FIG. 3. FIG. 3 shows two diagrams: an upper diagram in which the control signal "as" is plotted over time t and a lower diagram in which the position x of the actuator member 1 is plotted over time t.

The drive system 10 is exemplarily adapted to move the actuator member 1 during the maximum velocity determination procedure from a first position x1 to a second position x2 and expediently from the second position x2 to the first position x1. The first position x1 and/or the second position x2 is exemplarily an end position of the actuator member 1. The drive system 10 is adapted to determine the maximum velocity value vmax on the basis of the movement of the actuator member 1, for example using the sensor unit mentioned above, in particular the position sensor. As an example, the drive system 10 is adapted to determine a first maximum velocity value vmax1 on the basis of the movement of the actuator member 1 from the first position x1 to the second position x2 and to determine a second maximum velocity value vmax2 on the basis of the movement of the actuator member 1 from the second position x2 to the first position x1.

The upper diagram in FIG. 3 shows an exemplary control of the actuator 16 during the maximum velocity determination procedure. The control signal "as" is initially provided with a first signal value as1. At time t11 the signal value of the control signal "as" is changed from as1 to as2. As an example, a step or jump occurs, in particular a step or jump upwards, from as1 to as2. The control signal "as" is then held at as2. At time t21 the signal value of the control signal "as" is changed from as2 to as1. For example, a step or jump occurs, especially a step or jump downwards, from as2 to as1. Exemplarily, the signal value as2 is a maximum signal value of the control signal "as" and/or the signal value as1 is a minimum signal value of the control signal "as".

The lower diagram in FIG. 3 shows the movement of the actuator member 1 caused by the control of the actuator 16 explained above. The actuator member 1 is initially in the position x1. At the time t11, the actuator member 1 begins a movement in the direction of the position x2. At the time t12 the actuator member 1 reaches the position x2. At the time t21, the actuator member 1 begins a movement towards the first position x1, and at time t22, the actuator member 1 reaches the first position x1. The slope between t11 and t12 corresponds exemplarily to the first maximum velocity value vmax1 and the slope between t21 and t22 corresponds expediently to the second maximum velocity value vmax2.

In accordance with the embodiment explained above, the drive system 10 is adapted to perform the maximum velocity determination procedure to determine the maximum velocity value. As an alternative or in addition to this, the drive system 10 may be adapted to determine the maximum velocity value in normal operation, in particular to estimate it, for example on the basis of position values and/or velocity values determined in normal operation.

Expediently, the drive system 10 is adapted to repeatedly determine the maximum velocity value vmax. In this way, it can be determined how or whether the maximum velocity value vmax changes. Expediently, the drive system 10 is adapted to carry out a diagnosis, and in particular to determine wear, on the basis of one or more maximum velocity values. The diagnosis is preferably performed on a remote server, especially a cloud server.

Figure 2:
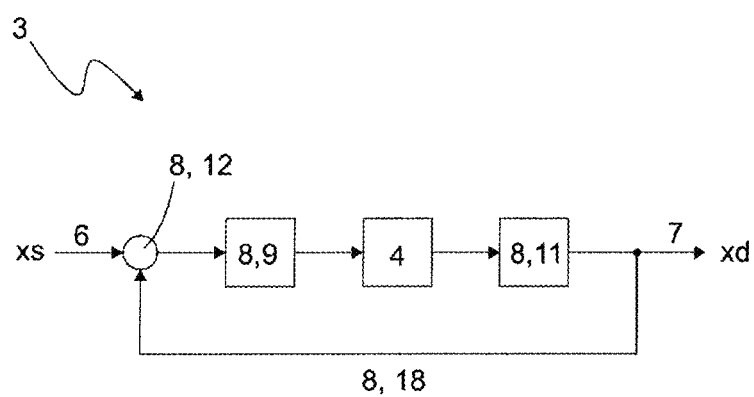

With reference to FIG. 2, an exemplary embodiment of the trajectory planning unit 3 will be discussed in more detail below.

The trajectory planning unit 3 has a planning unit input 6 for input of the setpoint signal xs and a planning unit output 7 for output of the trajectory signal xd.

Exemplarily, the trajectory planning unit 3 includes a retardation unit that is connected between the planning unit input 6 and the planning unit output 7. The result is a signal path from the planning unit input 6 via the retardation unit to the planning unit output 7. By the signal processing carried out in the retardation unit, the trajectory signal xd is generated from the supplied setpoint signal xs. The trajectory signal xd, in particular both the first signal section s1 and the second signal section s2, is thus provided using the retardation unit.

The retardation unit is especially adapted to provide the trajectory signal xd with a slope which depends on the difference between the trajectory signal xd and the setpoint signal xs. In particular, the retardation unit is adapted to provide the trajectory signal xd with a slope proportional to the difference between the trajectory signal xd and the setpoint signal xs. Preferably, the retardation unit is adapted to provide the trajectory signal xd with a larger slope at a larger difference between the trajectory signal xd and the setpoint signal xs and with a smaller slope at a smaller difference.

Expediently, the trajectory planning unit 3 further includes a limiting element 4 to limit the slope of the trajectory signal xd. The limiting element 4 is connected between the planning unit input 6 and the planning unit output 7. By limiting the slope of the trajectory signal xd via the limiting element 4, the first signal section S1 with the straight signal form results.

As an example, the retardation unit comprises the transfer elements 8. The transfer elements 8 are the transfer elements of a first order retardation element (also known as PT1 element). The first order retardation element may also be referred to as first order lag element or first order delay element.

The transfer elements 8 exemplarily comprise a proportional element 9, an integrating element 11 and a subtracting element 12. The transfer elements 8 are connected in series between the planning unit input 6 and the planning unit output 7. A feedback path 18 runs from the planning unit output 7 to the subtracting element 12.

The limiting element 4 is connected in series with the transfer elements 8. As an example, the limiting element 4 is connected in front of the integrating element 11 and, preferably, behind the proportional element 9.

The setpoint signal xs is fed via the planning unit input 6 to the subtracting element 12, which forms the difference between the setpoint signal xs and the trajectory signal xd. The difference is fed to the proportional element 9, which scales the difference by multiplying it by the factor 1/T. The scaled difference is fed to the input of the limiting element 4.

The limiting element 4 has at least one threshold value and is adapted to output at its output the signal value present at the input if the signal value present at the input is smaller than the threshold value (in particular in terms of its magnitude) and to output the threshold value if the signal value present at the input is greater than or equal to the threshold value (in particular in terms of its magnitude). Expediently, the limiting element 4 has an upper and a lower threshold value and is adapted to output the upper threshold value at its output if the signal value present at the input is greater than or equal to the threshold value, to output the signal value present at the input if the signal value present at the input is less than the upper threshold value and greater than the lower threshold value, and to output the lower threshold value if the signal value present at the input is less than or equal to the lower threshold value.

The output signal of the limiting element 4 is fed to the integrating element 11, which carries out an integration of this output signal and outputs the result of the integration as the trajectory signal xd.

According to an embodiment (not shown in the figures), the trajectory planning unit 3 further has a dead time element. Expediently, the dead time element is used to take into account, in the trajectory planning, a dead time that occurs in the drive system 10 in a start-up phase.

Further exemplary details are explained below.

The trajectory planning unit 3 is used in particular to provide a setpoint setting of a position control loop of a fluidic drive system. The trajectory planning unit 3 corresponds expediently to a PT1 element to which the limiting element 4 has been added. The parameterization of the trajectory planning unit 3 takes into account the dynamics of the system to be controlled. The required dynamic parameters are the maximum velocity values (can also be called maximum traversing velocities), which can be easily determined in an initialization phase or can also be estimated online, i.e. during operation, and can thus be adapted adaptively. Expediently, the trajectory planning unit 3 adapts the maximum velocity values during operation—in particular, adaptive trajectory planning is carried out.

In addition, dead times, which typically occur in the start-up phase of fluidic systems, can also be easily taken into account in trajectory planning.

Due to the trajectory planning, the drive system is guaranteed to be operated in the actuator variable limitation at the beginning—i.e. during the first signal section s1. In this way, static friction effects can be compensated to a maximum extent. Furthermore, a time-optimized trajectory is obtained (the drive system is operated at maximum velocity). To avoid overshooting of the drive system, the second signal section s2 is defined—a "soft landing" phase which brings the system to the setpoint without overshoot. In particular by means of a suitable selection of the signal parameter "a", it can be ensured that no overshoot occurs.

The target trajectory is approached up to a predefinable position x* with maximum velocity vmax (during the first signal section s1) and then automatically changes to a junction region (from t>t*). In this junction region (during the second signal section s2, also called "soft landing"), the trajectory planning unit behaves like a normal PT1 element. The junction (at t=t*) from the first signal section s1—the saturation region—to the second signal section s2—the so-called soft landing region—is (mathematically) smooth.

Thus, the trajectory planning unit 3, which is especially designed as a modified PT1 element, can be parameterized accordingly and provides a very simple, time-optimized trajectory planning adapted to the system behavior and furthermore avoids overshooting.

The movement of the actuator member 1 during an opening and closing movement is expediently linear; i.e. it has a constant velocity.

By knowing the maximum traversing velocity for opening and closing—i.e. the maximum velocity value vmax—the trajectory signal can be determined in such a way that on the one hand it takes into account the maximum traversing velocity and on the other hand avoids overshooting.

The trajectory planning unit 3 is expediently designed as a first-order retardation element (PT1 element), in which the signal at the input of the integrator (i.e. the velocity or slope) is limited. With such a trajectory planning unit 3, the trajectory signal xd can be generated in such a way that it is within the velocity limit up to a specific, predefinable position, resulting in the first signal section.

What is claimed is:

1. A pneumatic drive system, comprising:
a trajectory planning unit adapted to provide a trajectory signal based on a setpoint signal; and
a pneumatic actuator unit comprising an actuator member and adapted to control and/or regulate a position of the actuator member on the basis of the trajectory signal,
wherein the trajectory planning unit is adapted to provide the trajectory signal with a first signal section and a second signal section, the first signal section having a straight signal form and the second signal section having a signal form asymptotic to the setpoint signal, and
wherein, the trajectory planning unit comprises:
a planning unit input for inputting the setpoint signal;
a planning unit output for outputting the trajectory signal;
a retardation unit connected between the planning unit input and the planning unit output, the retardation unit having an integrating element; and
a limiting unit connected before the integrating element, and
wherein the retardation unit further comprises a proportional element and a subtracting element, wherein the subtracting element, the proportional element, the limiting unit and the integrating element are connected in series.

2. The pneumatic drive system according to claim 1, wherein the trajectory planning unit is adapted to provide the straight signal form based on a maximum velocity value of the actuator member.

3. The pneumatic drive system according to claim 2, wherein the trajectory planning unit is adapted to provide the straight signal form with a slope based on the maximum velocity value of the actuator member.

4. The pneumatic drive system according to claim 1, wherein the drive system is adapted to provide a time constant on the basis of a maximum velocity value and to provide the trajectory signal on the basis of the time constant.

5. The pneumatic drive system according to claim 4, wherein the drive system is adapted to provide the time constant also based on the setpoint signal.

6. The pneumatic drive system according to claim 2, wherein the drive system is adapted to perform a maximum velocity determination procedure in which the actuator member is set in motion to determine the maximum velocity value.

7. The pneumatic drive system according to claim 1, wherein the trajectory planning unit is adapted to provide the trajectory signal on the basis of a signal parameter by means of which it is possible to set at which signal value and/or at which time the first signal section ends and/or the second signal section begins.

8. The pneumatic drive system according to claim 1, wherein the trajectory planning unit is adapted to provide the second signal section directly after the first signal section.

9. The pneumatic drive system according to claim 1, wherein the trajectory planning unit is adapted to provide the trajectory signal with a junction from the first signal section to the second signal section, which junction is continuous in the first derivative.

10. The pneumatic drive system according to claim 1, wherein the trajectory planning unit comprises a limiting element for limiting the slope of the trajectory signal.

11. A drive system comprising:
a trajectory planning unit adapted to provide a trajectory signal based on a setpoint signal; and
an actuator unit comprising an actuator member and adapted to control and/or regulate a position of the actuator member on the basis of the trajectory signal,
wherein the trajectory planning unit is adapted to provide the trajectory signal with a first signal section and a second signal section, the first signal section having a straight signal form and the second signal section having a signal form asymptotic to the setpoint signal, and
wherein the trajectory planning unit comprises:
a planning unit input for inputting the setpoint signal;
a planning unit output for outputting the trajectory signal;
a retardation unit connected between the planning unit input and the planning unit output, the retardation unit being adapted to provide the trajectory signal using the retardation unit and having an integrating element; and
a limiting unit connected before the integrating element, and
wherein the retardation unit further comprises a proportional element and a subtracting element, wherein the subtracting element, the proportional element, the limiting unit and the integrating element are connected in series.

12. The drive system according to claim 11, wherein the retardation unit comprises the transfer elements of a first order retardation element.

13. The drive system according to claim 11, wherein the retardation unit comprises a proportional element and/or an integrating element and/or a subtracting element.

14. The drive system according to claim 13, wherein the trajectory planning unit comprises a limiting element for limiting the slope of the trajectory signal and the limiting element is connected before the integrating element.

15. A trajectory planning unit for providing a trajectory signal for controlling and/or regulating a position of an actuator member of a pneumatic actuator unit, wherein the trajectory planning unit comprises:
a planning unit input for inputting a setpoint signal;
a planning unit output for outputting the trajectory signal;
a retardation unit connected between the planning unit input and the planning unit output, the retardation unit having an integrating element; and
a limiting unit connected before the integrating element,
wherein the retardation unit further comprises a proportional element and a subtracting element, wherein the subtracting element, the proportional element, the limiting unit and the integrating element are connected in series.

* * * * *